United States Patent [19]

Weir

[11] 4,279,867
[45] Jul. 21, 1981

[54] PROCESS FOR THE RECOVERY OF COPPER AND ZINC VALUES FROM SULPHIDIC ORE

[75] Inventor: Donald R. Weir, Fort Saskatchewan, Canada

[73] Assignee: Sherritt Gordon Mines Limited, Toronto, Canada

[21] Appl. No.: 129,926

[22] Filed: Mar. 13, 1980

[30] Foreign Application Priority Data

Feb. 8, 1980 [CA] Canada .................................. 345417

[51] Int. Cl.³ .............................................. C01G 9/06
[52] U.S. Cl. ....................................... 423/26; 423/37; 423/41; 423/109; 204/119; 75/2; 75/120; 209/167
[58] Field of Search ...................... 423/26, 37, 41, 109; 204/119; 75/2, 120; 209/167

[56] References Cited

U.S. PATENT DOCUMENTS

| | | | |
|---|---|---|---|
| 1,577,328 | 3/1926 | Lewis | 209/167 |
| 1,735,190 | 11/1929 | Warren | 209/167 |
| 1,801,105 | 4/1931 | Phelan | 75/2 |
| 2,012,830 | 8/1935 | Ralston | 209/167 |
| 2,595,076 | 4/1952 | Hendrickson | 209/167 |

OTHER PUBLICATIONS

Gandin, *Flotation*, 2nd Edition, McGraw-Hill, N.Y. (1957) pp. 5-7, 182, 446-449.

*Primary Examiner*—Brian E. Hearn
*Attorney, Agent, or Firm*—Robert F. Delbridge; Arne I. Fors

[57] ABSTRACT

A process for the recovery of copper and zinc values from copper and zinc containing sulphidic ore includes subjecting ground ore to a flotation operation. An initial copper concentrate is floated in a first flotation step, and the initial copper concentrate is fed to a second flotation step to float a relatively zinc free copper concentrate. Remaining ore from the first flotation step is fed to a third flotation step to float an initial zinc concentrate, and remaining ore from the third flotation step is fed to a fourth flotation step to float a copper and zinc containing material. An intermediate concentrate containing from about 5 to about 25% copper and from about 2 to about 25% zinc, with a total of at least about 12% copper and zinc, is produced by selecting at least the remaining ore from the second flotation step, and a zinc concentrate containing at least about 20% zinc is produced by at least selecting a portion of the initial zinc concentrate.

12 Claims, 5 Drawing Figures

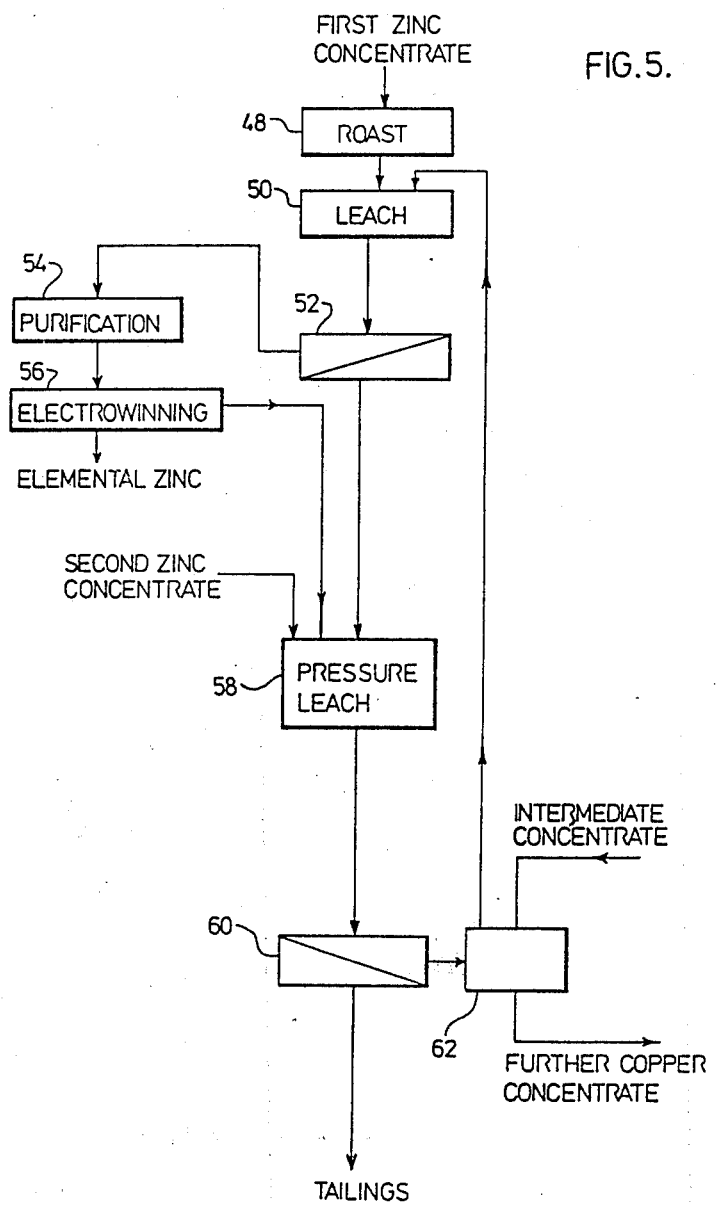

PROCESS FOR THE RECOVERY OF COPPER AND ZINC VALUES FROM SULPHIDIC ORE

This invention relates to the recovery of copper and zinc values from copper and zinc containing sulphidic ore.

In the conventional treatment of copper and zinc containing sulphidic ore, ground ore is subjected to a flotation operation which produces a copper concentrate, a zinc concentrate, and tailings. The flotation operation is conducted in such a manner that the zinc concentrate contains a sufficient amount of zinc to enable the concentrate to be economically treated in a conventional roast leach process in which the zinc concentrate is first roasted and then leached in acid solution. This has meant that the zinc concentrate has been produced with a zinc content of at least 35%, preferably at least 50%, and with an optimum iron content to facilitate leaching, the iron usually having been contained in the original ore. As a result of producing such a zinc concentrate, significant amounts of zinc are usually lost to the copper concentrate and to the tailings. In addition to such a zinc loss being undesirable, the presence of a significant amount of zinc in the copper concentrate is a substantial disadvantage since the copper concentrate is usually subsequently treated in a smelter, where the zinc causes undesirable problems. In the conventional flotation operation, significant amounts of copper are also lost to the zinc concentrate and to the tailings.

It is therefore an object of the invention to provide an improved process for the recovery of copper and zinc values from copper and zinc containing sulphidic ore in which such losses are substantially reduced.

According to the invention, a process for the recovery of copper and zinc values from copper and zinc containing sulphidic ore comprises subjecting ground ore to a flotation operation including a first flotation step to float an initial copper concentrate, feeding the initial copper concentrate to a second flotation step to float a relatively zinc free copper concentrate, feeding remaining ore from the first flotation step to a third flotation step to float an initial zinc concentrate, feeding remaining ore from the third flotation step to a fourth flotation step to float a copper and zinc containing material, producing an intermediate concentrate containing from about 5 to about 25% copper and from about 2 to about 25% zinc, with a total of at least about 12% zinc and copper, by selecting at least the remaining ore from the second flotation step, and producing a zinc concentrate containing at least about 20% zinc by at least selecting a portion of the initial zinc concentrate.

The invention enables copper concentrate to be produced which is relatively zinc free, for example with less than 1% zinc, thereby providing a greatly improved copper concentrate for treatment in a smelter. The zinc concentrate containing at least about 20% zinc can be economically leached under oxidizing acidic conditions at superatmospheric pressure, and copper values present in such concentrate can be separately recovered if desired. The intermediate concentrate can also be economically treated to recover copper and zinc. Further, the amount of copper and zinc remaining in the tailings, namely the remaining material from the fourth flotation step, is considerably lower than that remaining in the tailings from a conventional flotation operation.

The initial zinc concentrate may be fed to a fifth flotation step to float a further zinc concentrate, with the intermediate concentrate being produced by combining the remaining ore from the second flotation step with the remaining ore from the fifth flotation step, and the zinc concentrate being produced by combining the further zinc concentrate with the copper and zinc containing material.

The intermediate concentrate may consist of the remaining ore from the second flotation step, with the zinc concentrate being produced by combining the initial zinc concentrate with the copper and zinc containing material.

In the leaching step, some of the dissolved zinc is removed from the leach solution, for example by electro-winning, to produce a zinc-depleted solution. The intermediate concentrate may be treated with such zinc-depleted solution to dissolve zinc from the intermediate concentrate and to produce a further relatively zinc-free copper concentrate and a zinc-enhanced solution. The further relatively zinc-free copper concentrate may be subsequently treated in the same manner as the copper concentrate produced in the second flotation step, for example conventional treatment in a smelter. The zinc-enhanced solution can be conveniently recycled to the leach step.

The leach solution will frequently contain dissolved copper as well as dissolved zinc, and treatment of the intermediate concentrate with the zinc-depleted solution may also cause dissolved copper to precipitate as zinc dissolves from the intermediate concentrate to enhance the copper content of the relatively zinc free copper concentrate and to reduce the copper content of the zinc-enhanced solution.

Advantageously, the leach step may comprise two consecutive leach stages, with leach solution from the first leach stage being subjected to an electrowinning step to recover elemental zinc, solution remaining from the electro-winning step being fed to the second leach stage, and solution from the second leach stage being utilized to effect the treatment of the intermediate concentrate.

The two-stage leach may for example be such as described in U.S. Pat. No. 4,004,991 issued Jan. 25, 1977. Each leach stage may be conducted at a temperature of from about 110° to about 170° C. with an oxygen partial pressure of from about 150 to about 1000 kPa.

Alternatively, the leach step may be conducted with a single leach stage, for example as described in U.S. Pat. No. 3,867,268 issued Feb. 18, 1975. The temperature and oxygen partial pressure may be as indicated above for the two-stage leach.

The initial zinc concentrate may be fed to the fifth flotation step to float a further zinc concentrate containing at least about 45% zinc, with the zinc concentrate containing at least about 20% zinc being produced by selecting at least the remaining ore from the fifth flotation step. The further zinc concentrate may be roasted and then leached under acidic conditions to produce a leach solution and undissolved residue, with the zinc concentrate and undissolved residue being leached under oxidizing acidic conditions at superatmospheric pressure.

BRIEF DESCRIPTION OF THE DRAWINGS

Embodiments of the invention will now be described, by way of example, with reference to the accompanying drawings, of which:

FIG. 5 is a flow diagram showing a roasting and leaching operation for the treatment of the concentrates produced in the embodiment of FIG. 4.

Figure 1:
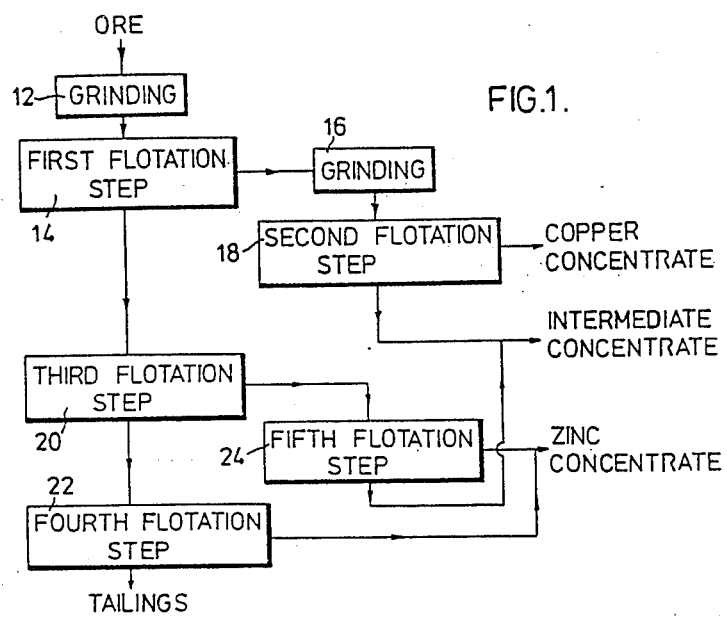
FIG. 1 is a flow diagram showing a flotation operation in accordance with one embodiment of the invention.

Referring first to FIG. 1, copper and zinc containing sulphidic ore with 1 to 1.5% copper and 1 to 2% zinc is subjected to a grinding step 12 to reduce the size of the ore particles to a suitable size. The ground ore is passed to a first flotation step 14 where an initial copper concentrate is floated from the remaining ore by means of roughers and scavengers. The initial copper concentrate is subjected to a grinding step 16 to further reduce the size of the concentrate particles, and the ground initial copper concentrate is passed to a second flotation step 18 where a relatively zinc free copper concentrate is floated from the remaining ore. In this manner, a copper concentrate containing less than 1% zinc is produced, and such a copper concentrate is especially useful for subsequent treatment in a conventional copper smelter. The remaining ore from the second flotation step is used as one component of an intermediate concentrate, as will be described in more detail later.

The remaining ore from the first flotation step 14 is passed to a third flotation step 20 to float an initial zinc concentrate by means of roughers and scavengers. The remaining ore from the third flotation step 20 is passed to a fourth flotation step 22 where a copper and zinc containing material is floated.

The initial zinc concentrate is then subjected to a fifth flotation step 24 to float a further zinc concentrate. The remaining ore from the fifth flotation step 24 is combined with the remaining ore from the second flotation step 18 to form an intermediate concentrate containing from 5 to 25% copper and from 2 to 25% zinc, with a total of at least 12% copper and zinc.

The copper and zinc containing material from the fourth flotation step is combined with the further zinc concentrate from the fifth flotation step 24 to produce a zinc concentrate with at least 20% zinc. The remaining ore from the fourth flotation step 22 is disposed of as tailings.

The first and second flotation steps 14, 18 are thus controlled to produce a copper concentrate having a minimum zinc content which, for practical purposes, is a zinc content of less than 1%. The third and fifth flotation steps 20, 24 are controlled to produce a further zinc concentrate with a zinc content of at least 20% and a minimum copper content which for practical purposes is less than 1.5%.

The fourth flotation step 22 is controlled to recover as much copper and zinc from the material treated, or in other words to ensure that as little copper and zinc as possible is lost to the tailings.

The combination of the remaining ore from the second and fifth flotation steps 18, 24 produces a useful intermediate concentrate containing copper and zinc, and the combination of the further zinc concentrate from the fifth flotation step 24 and the copper and zinc containing material from the fourth flotation step 22 produces a useful zinc concentrate. The tailings from the fourth flotation step 24 may contain less than 6% of the copper and less than 9% of the zinc in the original ore.

Figure 2:
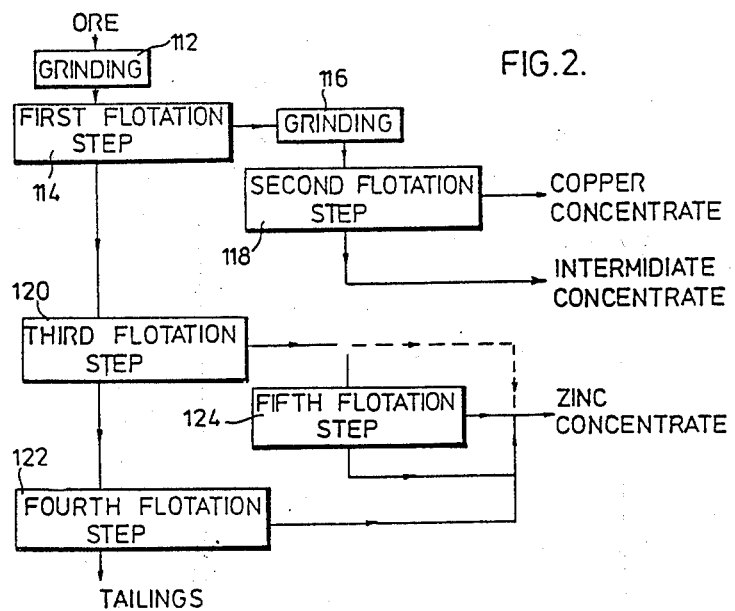
FIG. 2 is a flow diagram showing a flotation operation in accordance with a second embodiment of the invention

FIG. 2 shows an alternative arrangement with grinding and flotation steps corresponding to those of FIG. 1, with the various steps of FIG. 2 being indicated with reference numerals obtained by adding 100 to the reference numerals of FIG. 1.

In the embodiment of FIG. 2, the remaining ore from the second flotation step 118 is utilized as the intermediate concentrate product. The remaining ore from the fifth flotation step 124, instead of forming a component of the intermediate concentrate as in the embodiment of FIG. 1, is utilized as component of the zinc concentrate by combining the remaining ore from the fifth flotation step 124 with the further zinc concentrate from the fifth flotation step 124 and the copper and zinc containing material from the fifth flotation step 124. As indicated by the dotted line, the fifth flotation step 124 may actually be omitted, but in practice may still be carried out so that the arrangement may readily be altered to the embodiment shown in FIG. 1 or to the third embodiment to be described later.

Whether the embodiment of FIG. 1 or the embodiment of FIG. 2 is used depends mainly on the initial copper and zinc contents of the original ore and the preferred zinc and copper contents for the zinc concentrate product.

Figure 3:
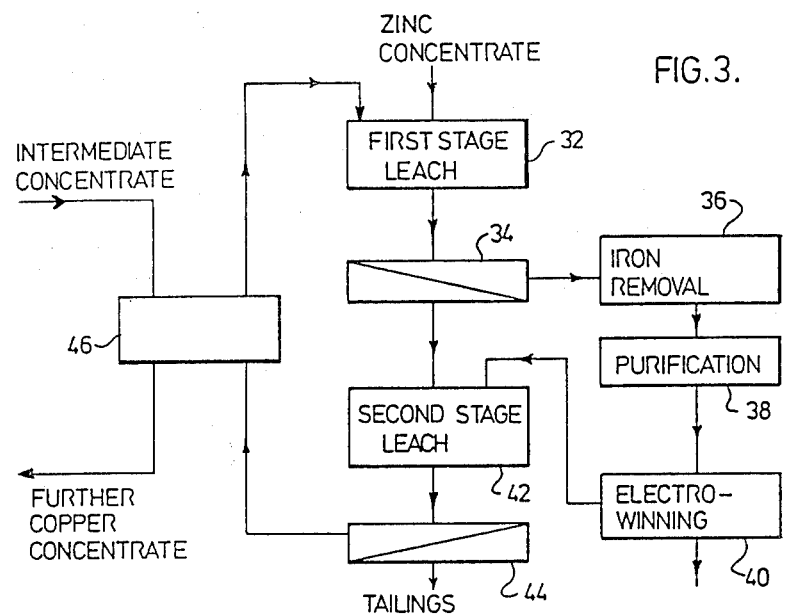
FIG. 3 is a flow diagram showing a leaching operation for treatment of the zinc concentrate and intermediate concentrate produced in the embodiments of FIG. 1 and FIG. 2.

FIG. 3 shows a preferred arrangement for treating the zinc concentrate product and the intermediate concentrate product produced in the embodiment of FIG. 1 or the embodiment of FIG. 2. The zinc concentrate product is subjected to a two-stage leaching operation such as that described in previously mentioned U.S. Pat. No. 4,004,991. The leaching operation includes a first stage leach 32 in which the zinc concentrate is leached in sulphuric acid solution at a temperature of about 150° C. under an oxygen partial pressure of about 700 kPa. The resulting slurry is then passed to a liquid/solids separation step 34 from which leach solution passes to a conventional iron removal step 36, purification step 38 and electrowinning step 40. The solids from the separation step 34 pass to a second stage leach 42 in which the solids are slurried with zinc-depleted acid solution from the electrowinning step 40, and are leached at a temperature of about 150° C. under an oxygen partial pressure of about 700 kPa. The resulting slurry is then passed to a liquid/solids separation step 44, from which the leach solution is passed to an intermediate concentrate treatment step 46, with the solid residue being disposed of as desired.

In the treatment step 46, the intermediate copper-zinc concentrate is slurried with the depleted zinc-containing acid solution from the second leach step 44. Because the zinc concentrate fed to the first leach stage 32 contains a certain amount of copper, the depleted zinc-containing solution passed to the treatment step 46 may also contain dissolved copper. In the treatment step 46, zinc in the intermediate concentrate dissolves to increase the zinc content of the leach solution and lower the zinc content of the intermediate concentrate. Also, dissolved copper present in the leach solution replaces some of the zinc in the intermediate concentrate. Thus, a further copper concentrate containing very little zinc is produced, and may be treated for the recovery of copper in a conventional manner. The zinc enhanced leach solution is then recycled to the first leach step 32 to provide acid for leaching the incoming zinc concentrate.

Instead of the two-stage leach operation described above, a single stage leach operation may be utilized, for example as described in previously mentioned U.S. Pat. No. 3,867,268, with the single leach stage being carried out at about 150° C. at an oxygen partial pressure of 700 kPa. For the single stage leach, the zinc-depleted solution from the electrowinning step is fed to the intermediate concentrate treatment step, instead of to the second stage leach as in the embodiment illustrated in FIG. 3.

As mentioned earlier, the original copper and zinc containing sulphidic ore usually also contains an amount of iron, and it is desirable that the zinc concentrate fed to the leaching operation should contain an optimum amount of iron, as is well known to a person skilled in the art. The flotation operation of the present invention readily enables a zinc concentrate of optimum iron content to be produced.

The described two-stage and single stage leaching operations in which the concentrate is leached under oxidizing acid conditions at superatmospheric pressure enable zinc to be economically recovered from zinc concentrate with a zinc concentrate as low as 20%. Further, the intermediate concentrate treatment step enables zinc to be transferred from the intermediate concentrate to the leaching operation for subsequent recovery of elemental zinc, and also enables dissolved copper in the leach solution be be transferred to the intermediate concentrate thereby forming a further copper concentrate with minimal zinc content.

Figure 4:
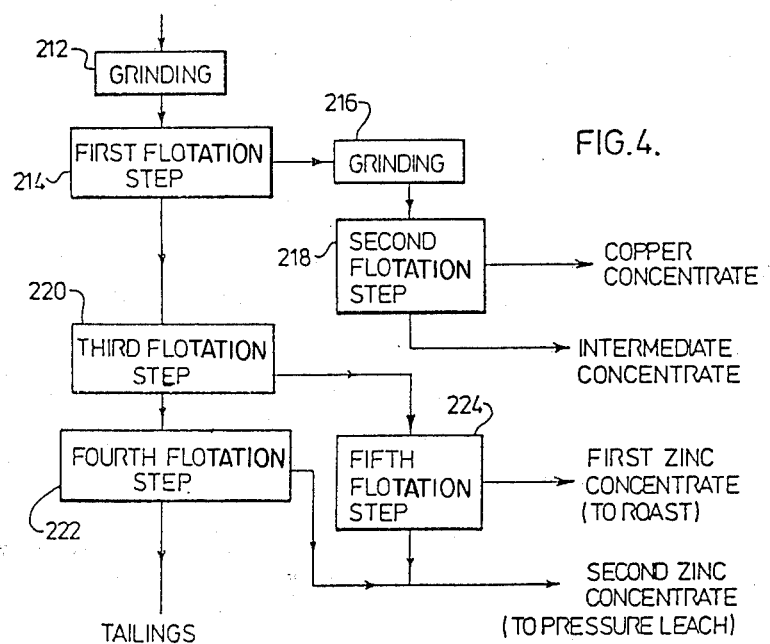
FIG. 4 is flow diagram showing a flotation operation in accordance with a third embodiment of the invention.

A third embodiment is illustrated in FIGS. 4 and 5. FIG. 4 shows similar grinding and flotation steps to those of FIGS. 1 and 2, with the various steps of FIG. 4 being indicated with reference numerals obtained by adding 200 to the reference numerals of FIG. 1.

Referring first to FIG. 4, relatively zinc free copper concentrate is floated in the second leach step 218 and the remaining ore from this step is utilized as the intermediate concentrate. The zinc concentrate from the fifth flotation step 224 has at least 45% zinc, preferably at least 50%, and is utilized a first zinc concentrate. The remaining ore from the fifth flotation step 224 and the copper and zinc containing material from the fifth flotation step 222 are combined to provide a second zinc concentrate with a zinc content of at least 20%.

Referring now to FIG. 5, the first zinc concentrate is roasted in a roasting step 48 and then leached under acidic conditions in a leaching step 50 in accordance with prior art processes of the kind referred to in the opening paragraphs of the specification. The leach solution is separated from the undissolved residue in a liquid/solids separation separation step 52, with the leach solution then being treated in purification and electrowinning steps 54, 56 to recover elemental zinc. The undissolved residue is then leached, together with the second zinc concentrate, in a leach step 58 under oxidizing acidic conditions at superatmospheric pressure. The zinc depleted solution from the electrowinning step 56 is recycled to the pressure leach step 58.

The leach solution is separated from the undissolved residue in a liquid-solids separation step 60 with the undissolved residue being discarded as tailings. The leach solution is then passed to an intermediate concentrate treatment step 62, similar to the treatment step 46 described with reference to FIG. 3, to produce a zinc-enhanced leach solution containing less copper and a copper concentrate containing less zinc and more copper than the intermediate concentrate. The zinc-enhanced leach solution is recycled to the leach step 50.

The first zinc concentrate can conveniently be leached in a conventional roast-leach process because it contains at least 45% and preferably at least 50% zinc, has a relatively low copper content and will usually have a relatively low iron content, as is desirable for such processes. The zinc concentrate containing at least 20% zinc with higher copper and iron content is leached in the pressure leach step 54, and the undissolved residue from the leach step 50 is conveniently further leached in the pressure leach step 54 to recover further zinc therefrom.

EXAMPLE 1

A sulphidic ore containing 1.25% copper and 1.22% zinc was subjected to the grinding and flotation steps described with reference to FIG. 1, and analyses of the various components obtained are shown in the following table.

TABLE 1

| | Component | % Cu | % Zn | % of Cu in orig. ore | % of Zn in orig. ore |
|---|---|---|---|---|---|
| 1. | Copper concentrate | 29.82 | 0.97 | 81.41 | 2.03 |
| 2. | Zinc concentrate from fifth flotation step | 1.28 | 55.69 | 1.93 | 64.29 |
| 3. | Remaining ore from second flotation step | 9.54 | 19.00 | 6.71 | 10.26 |
| 4. | Remaining ore from fifth flotation step | 1.71 | 30.69 | 0.58 | 8.03 |
| 5. | Copper-zinc concentrate from fourth flotation step | 4.72 | 12.00 | 3.88 | 7.58 |
| 6. | Tailings | 0.074 | 0.137 | 5.49 | 7.81 |

As indicated earlier with reference to FIG. 1, components 2 and 5 were combined to form the zinc concentrate product, which contained 39.80% zinc and 2.08% copper. Components 3 and 4 were combined to form the intermediate concentrate product, with 7.98% copper and 23.38% zinc. These products can thus readily be treated in the manner described with reference to FIG. 3.

The same ore was also subjected to a conventional flotation operation to provide a copper concentrate, a zinc concentrate, and tailings, and analyses of these components are shown in Table 2.

TABLE 2

| | Component | % Cu | % Zn | % of Cu in orig. ore | % of Zn in orig. ore |
|---|---|---|---|---|---|
| 1. | Copper concentrate | 25.67 | 4.66 | 88.12 | 12.29 |
| 2. | Zinc concentrate | 1.36 | 51.07 | 2.51 | 72.32 |
| 3. | Tailings | 0.129 | 0.263 | 9.37 | 15.39 |

It will be noted that the copper concentrate produced in accordance with the invention contains only 0.97% zinc compared with 4.66% zinc in the prior art copper concentrate. Further, the tailings produced with the present invention contained only 5.49% of the total amount of copper in the original ore and only 7.81% of the total amount of zinc in the original ore, compared to the corresponding amounts of 9.37% and 15.39% in the tailings of the prior art operation.

EXAMPLE 2

A sulphidic ore containing 1.33% copper and 1.26% zinc was subjected to the grinding and flotation steps described with reference to FIG. 2 and analyses of the various components obtained are shown in the following table.

TABLE 3

| | Component | % Cu | % Zn | % of Cu in orig. ore | % of Zn in orig. ore |
|---|---|---|---|---|---|
| 1. | Copper concentrate | 30.4 | 0.99 | 74.78 | 2.56 |
| 2. | Zinc concentrate from fifth flotation step | 0.94 | 55.80 | 0.50 | 31.3 |
| 3. | Remaining ore from second flotation step | 17.44 | 3.85 | 14.96 | 3.47 |
| 4. | Remaining ore from fifth flotation step | 1.76 | 48.89 | 1.32 | 42.86 |
| 5. | Copper-zinc concentrate from fourth flotation step | 4.80 | 11.95 | 4.27 | 11.17 |
| 6. | Tailings | 0.06 | 0.118 | 4.17 | 8.64 |

Components 2, 4 and 5 were combined to form the zinc concentrate product, with 35.96% zinc and 2.76% copper. Component 3 formed the intermediate concentrate product with 17.44% copper and 3.85% zinc. These products can thus easily be treated in the manner described with reference to FIG. 3.

The same ore was also subjected to a conventional flotation operation to produce a copper concentrate, a zinc concentrate and tailings and analyses of these components are shown in Table 4.

TABLE 4

| | Component | % Cu | % Zn | % of Cu in orig. ore | % of Zn in orig. ore |
|---|---|---|---|---|---|
| 1. | Copper concentrate | 27.05 | 1.73 | 89.74 | 6.03 |
| 2. | Zinc concentrate | 1.33 | 51.6 | 1.82 | 74.16 |
| 3. | Tailings | 0.12 | 0.267 | 8.44 | 19.81 |

Instead of the components being combined as described above for use in the manner described with reference to FIG. 3, the components may be selected for use in the process described with reference to FIGS. 4 and 5. Thus component 2, namely the zinc concentrate from the fifth flotation step, contains about 55% zinc, and thus may readily be treated in the roast-leach steps. Components 4 and 5 may be combined to form a zinc concentrate containing about 30% zinc and 3.3% copper, which thus may readily be treated in the pressure leach step 54. Component 3 again can be utilized as the intermediate concentrate.

The advantages of the present invention will be readily apparent to a person skilled in the art from the foregoing description of preferred embodiments and specific examples. Other embodiments and examples will be apparent to a person skilled in the art, the scope of the invention being defined in the appended claims.

What I claim as new and desire to protect by Letters Patent of the United States is:

1. A process for the recovery of copper and zinc values from copper and zinc containing sulphidic ore comprising subjecting ground ore to a flotation operation including a first flotation step to float an initial copper concentrate, feeding said initial copper concentrate to a second flotation step to float a relatively zinc free copper concentrate, feeding remaining ore from the first flotation step to a third flotation step to float an initial zinc concentrate, feeding the remaining ore from the third flotation step to a fourth flotation step to float a copper and zinc containing material, producing an intermediate concentrate containing from about 5 to about 25% copper and from about 2 to about 25% zinc, with a total of at least about 12% copper and zinc, by selecting at least the remaining ore from the second flotation step, and producing a zinc concentrate containing at least about 20% zinc by at least selecting a portion of the initial zinc concentrate.

2. A process according to claim 1 including feeding the initial zinc concentrate to a fifth flotation step to float a further zinc concentrate, producing said intermediate concentrate by combining the remaining ore from the second flotation step with the remaining ore from the fifth flotation step, and producing said zinc concentrate by combining the further zinc concentrate with the copper and zinc containing material.

3. A process according to claim 1 wherein said intermediate concentrate consists of the remaining ore from the second flotation step, and including producing said zinc concentrate by combining the initial zinc concentrate with the copper and zinc containing material.

4. A process according to claim 1 including feeding the initial zinc concentrate to a fifth flotation step to float a further zinc concentrate containing at least about 45% zinc, and producing said zinc concentrate containing at least about 20% zinc by selecting at least the remaining ore from the fifth flotation step.

5. A process according to claim 4 including roasting said further zinc concentrate, leaching the roasted concentrate under acidic conditions to provide a leach solution and undissolved residue, and leaching said zinc concentrate and said undissolved residue under oxidizing acidic conditions at superatmospheric pressure to produce a leach solution containing dissolved zinc.

6. A process according to claim 1 further including leaching said zinc concentrate under oxidizing acidic conditions at superatmospheric pressure to produce a leach solution containing dissolved zinc, removing some of said dissolved zinc from said leach solution to produce a zinc-depleted solution, and treating said intermediate concentrate with said zinc-depleted solution to dissolve zinc from the intermediate concentrate and produce a further relatively zinc-free copper concentrate and a zinc-enhanced solution, and recycling said zinc-enhanced solution to the leach step.

7. A process according to claim 6 wherein the leach solution containing dissolved zinc also contains dissolved copper, and treatment of the intermediate concentrate with said zinc depleted solution also causes dissolved copper to precipitate as zinc dissolves from the intermediate concentrate and thereby enhance the copper content of the further relatively zinc-free copper concentrate.

8. A process according to claim 6 wherein the leach step comprises two consecutive leach stages, with leach solution from the first leach stage being subjected to an electro-winning step to recover elemental zinc, solution remaining from the electrowinning step being fed to the second leach stage, and solution from the second leach stage being utilized to effect said treatment of said intermediate concentrate.

9. A process according to claim 8 wherein the first and second leach stages are each carried out at a temperature of from about 110° to about 170° C. under an oxygen partial pressure of from about 150 to about 1000 kPa.

10. A process for the recovery of copper and zinc values from copper and zinc containing sulphidic ore comprising subjecting ground ore to a flotation operation including a first flotation step to float an initial copper concentrate, feeding said initial copper concentrate to a second flotation step to float a relatively zinc free copper concentrate, feeding remaining ore from the first flotation step to a third flotation step to float an initial zinc concentrate, feeding the remaining ore from the third flotation step to a fourth flotation step to float a copper and zinc containing material, producing an intermediate concentrate containing from about 5 to about 25% copper and from about 2 to about 25% zinc, with a total of at least about 12% copper and zinc, by selecting at least the remaining ore from the second flotation step, producing a zinc concentrate containing at least about 20% zinc by at least selecting a portion of the initial zinc concentrate, and leaching said zinc concentrate under oxidizing acidic conditions at superatmospheric pressure to produce a leach solution containing dissolved zinc.

11. A process according to claim 10 including feeding the initial zinc concentrate to a fifth flotation step to float a further zinc concentrate, producing said intermediate concentrate by combining the remaining ore from the second flotation step with the remaining ore from the fifth flotation step, and producing said zinc concentrate by combining the further zinc concentrate with the copper and zinc containing material.

12. A process according to claim 10 wherein said intermediate concentrate consists of the remaining ore from the second flotation step, and including producing said zinc concentrate by combining the initial zinc concentrate with the copper and zinc containing material.

* * * * *